US010584186B2

(12) United States Patent
Yan

(10) Patent No.: US 10,584,186 B2
(45) Date of Patent: Mar. 10, 2020

(54) SILANE-FUNCTIONALIZED POLYMER AND PROCESS FOR MAKING AND USING SAME

(71) Applicant: Bridgestone Corporation, Chuo-ku (JP)

(72) Inventor: Yuan-Yong Yan, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 47 days.

(21) Appl. No.: 15/746,665

(22) PCT Filed: Jul. 22, 2016

(86) PCT No.: PCT/US2016/043650
§ 371 (c)(1),
(2) Date: Jan. 22, 2018

(87) PCT Pub. No.: WO2017/015592
PCT Pub. Date: Jan. 26, 2017

(65) Prior Publication Data
US 2018/0215844 A1 Aug. 2, 2018

Related U.S. Application Data

(60) Provisional application No. 62/195,433, filed on Jul. 22, 2015.

(51) Int. Cl.
| | | |
|---|---|---|
| *C08C 19/25* | (2006.01) | |
| *C08C 19/44* | (2006.01) | |
| *C08F 36/04* | (2006.01) | |
| *C08F 236/10* | (2006.01) | |
| *C08L 9/06* | (2006.01) | |
| *C08C 19/20* | (2006.01) | |
| *C08C 19/22* | (2006.01) | |
| *C08F 8/42* | (2006.01) | |
| *C08F 236/06* | (2006.01) | |

(52) U.S. Cl.
CPC .............. *C08C 19/25* (2013.01); *C08C 19/20* (2013.01); *C08C 19/22* (2013.01); *C08C 19/44* (2013.01); *C08F 8/42* (2013.01); *C08F 36/04* (2013.01); *C08F 236/10* (2013.01); *C08L 9/06* (2013.01); *C08F 236/06* (2013.01)

(58) Field of Classification Search
CPC .................................................... C08G 77/442
See application file for complete search history.

(56) References Cited

U.S. PATENT DOCUMENTS

| | | | |
|---|---|---|---|
| 4,771,117 A | 9/1988 | Citron et al. | |
| 5,047,492 A | 9/1991 | Weidner et al. | |
| 5,206,293 A | 4/1993 | Sakai et al. | |
| 5,330,836 A | 7/1994 | Buese et al. | |
| 5,780,551 A | 7/1998 | Engel et al. | |
| 6,288,257 B1 | 9/2001 | Schattenmann et al. | |
| 6,346,593 B1 | 2/2002 | Hupfield et al. | |
| 6,410,630 B1 | 6/2002 | Hoover et al. | |
| 7,576,169 B2 | 8/2009 | Hasegawa et al. | |
| 8,044,145 B2 | 10/2011 | Yodogawa et al. | |
| 8,063,153 B2 | 11/2011 | Yan et al. | |
| 8,586,691 B2 | 11/2013 | Yon | |
| 9,035,005 B2 | 5/2015 | Mazumdar et al. | |
| 9,206,277 B2 | 12/2015 | Tanaka | |
| 9,212,276 B2 | 12/2015 | Tanaka et al. | |
| 9,221,923 B2 * | 12/2015 | Yan ......................... C08L 21/00 | |
| 9,250,357 B2 * | 2/2016 | Mahadevan ........... G02B 1/043 | |
| 9,260,540 B1 | 2/2016 | Yon | |
| 2009/0092892 A1 * | 4/2009 | Yamaguchi ............. H01M 4/13 | 429/125 |
| 2010/0041810 A1 | 2/2010 | Wakabayashi et al. | |
| 2014/0120243 A1 * | 5/2014 | Laine ....................... C07F 7/21 | 427/58 |
| 2015/0203612 A1 | 7/2015 | Minagawa | |

FOREIGN PATENT DOCUMENTS

| | | |
|---|---|---|
| EP | 2147907 A1 | 1/2010 |
| GB | 2368069 A | 4/2002 |
| JP | 6205788 B2 | 10/2017 |
| WO | 2009045302 A9 | 7/2009 |
| WO | 2010114110 A1 | 10/2010 |

OTHER PUBLICATIONS

M. Cypryk et al., "Mechanism of the Acid-Catalyzed Si—O Bond Cleavage in Siloxanes and Siloxanols. A Theoretical Study," Organometallics 2002, 21, pp. 2165-2175 (American Chemical Society; Washington, DC).
J.H. Clark, "Fluoride Ion as a Base in Organic Synthesis," Chem. Rev. 1980, 80, pp. 429-452 (American Chemical Society; Washington, DC).
J. Lee et al., "Synthesis and Characterization of Well-Defined Poly(α-methylstyrene)-b-polydimethylsiloxane) Block Copolymers," Macromolecules 2001, 34, pp. 2095-2100 (American Chemical Society; Washington, DC).
K. Almdal et al., Order, Disorder, and Composition Fluctuation Effects in Low Molar Mass Hydrocarbon-Poly (dimethylsiloxane) Diblock Copolymers, Macromolecules 1996, 29, pp. 5940-5947 (American Chemical Society; Washington, DC).
L.L. Hench et al., "The Sol-Gel Process," Chem. Rev. 1990, 90, pp. 33-72 (American Chemical Society; Washington, DC).
A. Sanchez et al., "Sol-Gel Chemistry of Aminopropyltrialkoxy Silanes," Polymer Preprints 2001, 42(1), pp. 182-183 American Chemical Society; Washington, DC).

(Continued)

*Primary Examiner* — Marc S Zimmer
(74) *Attorney, Agent, or Firm* — Meredith E. Hooker; David G. Burleson

(57) ABSTRACT

A functionalized polymer can be prepared by a process that includes reacting (a) an ethylenically unsaturated reactant polymer which, at its terminus, includes Si-containing repeat unit(s) with (b) one or more silanes, at least one of which includes at least one primary amine, secondary amine, phosphine, hydroxyl, thiol, cyano, urea or thiourea group.

20 Claims, No Drawings

(56) References Cited

OTHER PUBLICATIONS

T. Huang et al., "Synthesis and characterization of (star polystyrene)-block-(linear polydimethylsiloxane)-block-(star polystyrene) triblock copolymers," Polymer Bulletin 2002, 49, pp. 143-150 (Springer-Verlag; Weinheim, Germany).
V. Bellas et al., "Controlled Anionic Polymerization of Hexamethylcyclotrisiloxane. Model Linear and Miktoarm Star Co- and Terpolymers of Dimethylsiloxane with Styrene and Isoprene," Macromolecules 2000, 33, pp. 6993-6997 American Chemical Society; Washington, DC).
Extended European search report in EP appl. No. 16828631.8, dated Feb. 26, 2019.
Derwent Abstract No. 2014-S13427 (XP-002788892), JP publ. No. 2014-193983.
Examination report dated Sep. 29, 2019 in CN appl. No. 201680052226.3.

\* cited by examiner

SILANE-FUNCTIONALIZED POLYMER AND PROCESS FOR MAKING AND USING SAME

CROSS-REFERENCE TO RELATED APPLICATION

This application is a national stage entry of international application no. PCT/US2016/043650, filed 22 Jul. 2016, which claims the benefit of U.S. provisional appl. No. 62/195,433, filed 22 Jul. 2015, the disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, and surface grafting.

The section of a polymer chain from the site of the last crosslink to an end of the polymer chain is not tied to the macromolecular network and thus cannot be involved in an efficient elastic recovery process. As a result, energy transmitted to this section of the polymer (and vulcanizate in which such polymer is incorporated) is lost as heat, making such free ends a major source of hysteretic losses. Ensuring that polymer chain ends are tied to, or otherwise interact well with, reinforcing particulate fillers, is important to many vulcanizate physical properties such as, for example, reduced hysteresis. Chemically modifying the polymer, typically at a terminus thereof, is one of the most effective ways of increasing interactivity of fillers and polymers.

Various elastomeric materials are used in the manufacture of vulcanizates, including tire components. In addition to natural rubber, some of the most commonly employed include high-cis polybutadiene, often made by processes employing catalysts, and substantially random styrene/butadiene interpolymers, often made by processes employing anionic initiators. A reactant that can provide a terminal functional group to a carbanionic (anionically initiated) styrene/butadiene interpolymer often will not react with the pseudo-living end of high-cis polybutadiene and, to a lesser extent, vice versa.

Attachment of certain functional groups, including hydroxyl groups, thiol groups, primary and secondary amine groups, and phosphine groups, to terminally active polymers, particularly carbanionic polymers, is difficult. The active hydrogen atoms present in such groups tends to quench or terminate the terminally active polymer. This undesired termination some-times can be avoided through use of indirect attachment schemes, i.e., reaction schemes that allow for attachment of compounds that contain other types of functional groups which then can be converted to the desired active hydrogen atom-containing functional group.

SUMMARY

In one aspect is provided a polymer having a terminal radical that contains a functional group capable of providing enhanced interactivity with particulate filler but which would terminate a reactive polymer if directly bonded. This functionalized polymer can be the reaction product of (a) an ethylenically unsaturated reactant polymer which, at its terminus, includes from one to eight repeat units defined by the formula

where each of $R^1$ and $R^2$ independently is a hydrogen atom or a substituted or unsubstituted hydrocarbyl group and where Z is an O atom, S atom, $BR^7$ group where $R^7$ is an O atom, H atom or $C_1$-$C_{12}$ alkyl group, or $NR^3$ group where $R^3$ is a a hydrocarbyl group, with (b) one or more silanes, at least one of which includes at least one primary amine, secondary amine, phosphine, hydroxyl, thiol, cyano, or (thio)urea group. At least one of $R^1$ and $R^2$ in the general formula (I) unit can be a hydrogen atom in certain embodiments.

In certain embodiments, the one or more silanes include at least one silane defined by the formula

where each a independently is an integer of from 0 to 2, each $R^4$ independently is a $C_1$-$C_{12}$ alkyl group, and $R^5$ is a $C_2$-$C_{10}$ alkylene group which optionally contains a di- or tetra-sulfide linkage.

In these and other embodiments, the reactant polymer can be provided by reacting a terminally active polymer with a cyclic compound having the following formula

where n is an integer of from 3 to 8, Z is an O atom, S atom, $BR^7$ group or $NR^3$ group with all variables being defined as above. A silicon atom of the formula (III) compound is believed to react with a C atom at a polymer chain terminus so as to result in attachment of a ring-opened version of the compound to a terminus of the polymer.

A terminally modified polymer which is made as described in the preceding paragraph can react with the one or more silanes as described previously. This reaction can be catalyzed by a source of fluoride ions such as, for example, ammonium fluoride or a tetrahydrocarbylammonium fluoride.

In each of the foregoing, the polymer chains that contain ethylenic unsaturation can include polyene mer units. In certain embodiments, the polyenes can be conjugated dienes, and the resulting conjugated diene mer can be incorporated substantially randomly along the polymer chain.

In each aspect, the polymer can be substantially linear.

The functionalized polymer can interact with particulate filler such as, for example, carbon black and silica. Compositions, including vulcanizates, that include particulate fillers and such polymers also are provided, as are methods of providing and using such compositions.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"random interpolymer" means an interpolymer having mer units derived from each type of constituent monomer incorporated in an essentially non-repeating manner and being substantially free of blocks, i.e., segments of three or more of the same mer;

"reactive polymer" means a polymer having at least one site which, because of the presence of an associated initiator, readily reacts with other molecules, with the term being inclusive of, inter alia, carbanionic polymers;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"substituted" means containing a heteroatom or functionality (e.g., hydrocarbyl group) that does not interfere with the intended purpose of the group or molecule in which such heteroatom or functionality is located;

"directly bonded" means covalently attached with no intervening atoms or groups;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" or "residue" means the portion of a molecule that remains after reacting with another molecule, regardless of whether any atoms are gained or lost as a result of the reaction;

"ring system" means a single ring or two or more fused rings or rings linked by a single bond, with the proviso that each ring includes unsaturation;

"(thio)urea" means urea or thiourea;

"terminus" means an end of a polymeric chain;

"terminally active" means a polymer with a living or pseudo-living terminus; and "terminal moiety" means a group or functionality located at a terminus.

Throughout this document, all values given in the form of percentages are weight percentages unless the surrounding text explicitly indicates a contrary intention. The relevant teachings of all patents and published applications mentioned below, are incorporated herein by reference.

DETAILED DESCRIPTION OF ILLUSTRATIVE EMBODIMENTS

The polymer summarily described in the preceding section generally includes unsaturated mer units, typically units derived from one or more types of polyenes, and terminal functionality that includes up to 8 repeat units defined by general formula (I).

The polymer can be elastomeric and can include unsaturated mer units such as those derived from polyenes, particularly dienes and trienes (e.g., myrcene). Illustrative polyenes include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from ~10 to ~80%, optionally from ~25 to 65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be "substantially linear." For certain end use applications, however, keeping the content of 1,2-linkages even lower—e.g., to less than ~7%, less than 5%, less than 2%, or less than 1%—can be desirable.

Depending on the intended end use, one or more of the polymer chains can include pendent aromatic groups, which can be provided, for example, through incorporation of mer units derived from vinyl aromatics, particularly the $C_8$-$C_{20}$ vinyl aromatics such as styrene, α-methyl styrene, p-methyl styrene, the vinyl toluenes, the vinyl naphthalenes, and the like. When used in conjunction with one or more polyenes, mer units with pendent aromatic groups can constitute from ~1 to ~50%, from ~10 to ~45%, or from ~20 to ~35%, of the polymer chain; the microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Depending on the nature of the polymer desired, the particular conditions of the solution polymerization can vary significantly. In the discussion that follows, a description of an illustrative living (anionic) polymerization precedes a description of functionalization and processing of polymers so made.

Solution polymerization typically involves an initiator such as an organolithium compound, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functional initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815). Other potentially useful functional initiators include, but are not limited to, those described in U.S. Pat. Nos. 8,871,871, 8,765,888, 8,227,562 and 9,365,660.

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; potassium 2-methylbutan-2-olate (KTA); and linear and cyclic oligomeric oxolanyl alkanes (see, e.g., U.S. Pat. No. 4,429,091) such as 2,2-bis (2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for convenience of the reader. The following is based on a batch process, although extending this description to, e.g., semibatch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. Polymerization preferably is conducted with moderate to vigorous agitation under anaerobic conditions provided by an inert protective gas such as $N_2$, Ar or He. The polymerization temperature may vary widely, although typically a temperature of from ~20° to ~90° C. is employed (with temperatures up to ~150° C. being possible); heat can be removed by external cooling and/or evaporation of the monomer or solvent. Polymerization pressure employed may vary widely, although typically a pressure of from ~0.1 to ~1 MPa is employed. The reactants can be agitated if desired. After a desired degree of conversion has been reached, the heat source (if used) can be removed and, if the reaction vessel is to be reserved solely for polymerizations, the reaction mixture can be removed to a post-polymerization vessel for functionalization and/or quenching. At this point, the reaction mixture commonly is referred to as a "polymer cement" because of its relatively high concentration of polymer.

A quenched sample of the resulting polymer typically exhibits a gum Mooney viscosity ($ML_4/100°$ C.) of from ~2 to ~150, more commonly from ~2.5 to ~125, even more commonly from ~5 to ~100, and most commonly from ~10 to ~75; the foregoing generally correspond to a $M_n$ of from ~5000 to ~250,000 Daltons, commonly from ~10,000 to ~200,000 Daltons, more commonly from ~25,000 to ~150,000 Daltons, and most commonly from ~50,000 to ~125,000 Daltons. The resulting interpolymer typically has a molecular weight distribution of from 1 to 10, commonly from 1.5 to 7.5, and more commonly from 2 to 5. (Both $M_n$ and $M_w$ can be determined by GPC using polystyrene standards for calibration and appropriate Mark-Houwink constants.)

The described polymerization process advantageously results in polymer chains that possess reactive (living) terminals, which can be further reacted with one or more functionalizing agents so as to provide functionalized polymers. As described above, functionalization can enhance the interaction between the polymer and particulate fillers in rubber compounds, thereby improving the mechanical and dynamic properties of the resulting vulcanizates.

The polymer preferably is functionalized so as to include a moiety, typically directly bonded to the polymer, which includes multiple Si atoms separated by O, S, B or N atoms. The Si atoms can have H atoms directly bonded thereto.

This functionalization can be accomplished by reacting a reactive (e.g., carbanionic) polymer with a formula (III) compound. In those compounds, n is an integer of from 3 to 8. Specific structures of formula (III) compounds where n is 3 or 4 include:

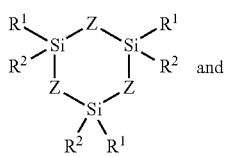

(III-a)

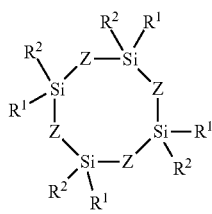

(III-b)

where Z, $R^1$ and $R^2$ are defined as above. One or both of $R^1$ and $R^2$ can be a hydrocarbyl group, which typically is an aryl, (cyclo)alkyl, alkenyl, alkenaryl, aralkenyl, alkaryl, or aralkyl group, most commonly a $C_1$-$C_6$ substituent such as a $C_1$-$C_3$ alkyl group, a $C_5$-$C_6$ cycloalkyl group or a $C_6$ aryl group. The hydrocarbyl group can be substituted, as defined above; non-limiting examples of potentially useful substituted hydrocarbyl groups include $C_1$-$C_6$ alkoxy groups (as well as sulfur analogs) and secondary amino groups. In some embodiments, preference is given to those formula (III) compounds where one or both of $R^1$ and $R^2$ is H. $R^3$ preferably is a $C_1$-$C_{12}$, typically a $C_1$-$C_6$, alkyl group. Exemplary hydrocarbyl groups include aryl, (cyclo)alkyl, alkenyl, alkenaryl, aralkenyl, alkaryl, or aralkyl group, most commonly a $C_1$-$C_6$ substituent such as a $C_1$-$C_3$ alkyl group, a $C_5$-$C_6$ cycloalkyl group or a $C_6$ aryl group. If $R^7$ is not an O or H atom, it preferably is a $C_1$-$C_6$ alkyl group.

Given the foregoing structures and the definitions of the variables, the ordinarily skilled artisan can envision scores of species defined by these structures, as well as larger (i.e., 5≤n≤8) analogs.

Reaction of the foregoing types of compounds with a terminally active polymer can be performed in less than ~100 minutes, often fewer than ~50 minutes, at moderate temperatures, e.g., 00 to 75° C. Reaction typically occurs between a C atom of the polymer chain and a Si atom of the cyclic siloxane, silazane, etc. Because of the reactivity of reactive polymers, such as carbanionic (living) polymers, the molar or equivalent amount of functionalizing compound need be no greater than essentially 1:1 relative to the amount of initiator employed in the polymerization. although lower and higher ratios certainly can be employed.

For additional information on the foregoing silicon-containing compounds and their reactions with terminally active (living) polymers, the interested reader is directed to, for example, U.S. Pat. Nos. 8,063,153, 8,586,691, 8,680,210 and 9,221,923.

After this type of reaction, the polymer includes at its terminus from 1 up to 8 repeat units defined by general formula (I) above. This terminally modified polymer then can participate in reactions with one or more silanes, including at least one which includes at least one primary amine, secondary amine, phosphine, hydroxyl, thiol, cyano, or (thio)urea group.

A terminally modified polymer as described in the preceding paragraph can react with the one or more silanes in a reaction catalyzed by a source of fluoride ions. Any of a variety of ionic compounds that include a fluoride anion can be used as this catalyst, but preference is given to those which are at least partially soluble in at least one type of organic liquid employed in the polymerization, e.g., THF. A preferred class of fluoride compounds are the tetrahydrocarbylammonium fluorides, i.e., compounds having the general formula $$R^6{}_4N^+F^- \qquad (IV)$$

where each $R^6$ independently is H or a substituted or unsubstituted hydrocarbyl group such as aryl, (cyclo)alkyl, alkenyl, alkenaryl, aralkenyl, alkaryl, or aralkyl group, most commonly a $C_1$-$C_6$ substituent such as a $C_2$-$C_6$ alkyl group, a $C_5$-$C_6$ cycloalkyl group or a $C_6$ aryl group. The $R^6$ hydrocarbyl group can be substituted, as defined above; non-limiting examples of potentially useful substituted hydrocarbyl groups include $C_1$-$C_6$ alkoxy groups (as well as sulfur analogs) and secondary amino groups. In certain embodiments, each $R^6$ group can be an alkyl group (i.e., a tetraalkylammonium fluoride), with each $R^6$ optionally being the same alkyl group, for example, tetrapropylammonium fluoride, tetra-n-butylammonium fluoride (TBAF), etc.

A less-than-stoichiometric amount of the source of fluoride ions can be employed, with stoichiometry being based on the amount of initiator employed in making the polymer, i.e., moles of $Li^+$. The compound which acts as a source of fluoride ions generally can be added at 10 to 90 mole percent, often 20 to 80 mole percent, typically 25 to 75 mole percent, and more typically 30 to 60 mole percent, all based on the moles of Li employed in making the carbanionic polymer.

For the discussion which follows, the genus of silanes that include at least one primary amine, secondary amine, phosphine, hydroxyl or thiol group are referred to as "mandatory silanes" while others are referred to as "optional silanes."

Mandatory silanes are those compounds which include at least one $(R^4O)_{3-a}R^4{}_a$Si-group (with $R^4$ and a being defined as above) and at least one primary amine, secondary amine, phosphine, hydroxyl, thiol, cyano, or (thio)urea group. Certain mandatory silanes can be represented by the general formula $$(R^4O)_{3-a}R^4{}_a SiR' \qquad (V)$$

where $R^4$ and a are defined as above and R' represents an alkyl or aryl group that includes at least one functional group that would terminate a reactive polymer, specifically, a primary amine, secondary amine, phosphine, hydroxyl, thiol, cyano, or (thio)urea group. Non-limiting examples of R' moieties include $C_3$-$C_{10}$ alkyl groups, preferably linear alkyl groups, which includes at least one primary amine, secondary amine, phosphine, hydroxyl, thiol, cyano, or (thio)urea group including (with X representing the type of active H atom-containing group described previously and Z being as defined above) —$(CH_2)_3$X, —$(CH_2)_3$NH$(CH_2)_2$X, —$(CH_2)_3$Z$(CH_2)_2$X, —$(CH_2)$NIH$(CH_2)_6$X, —$(CH_2)$Z$(CH_2)_6$X, —$(CH_2)_3$NH$(CH_2)_2$NH$(CH_2)_2$X, —$(CH_2)_3$NH$(CH_2)_2$CH_3$, —$(CH_2)_3$Z$(CH_2)_2$NH$(CH_2)_2$X, —$(CH_2)_3$NH$(CH_2)_2$Z$(CH_2)_2$X, —$(CH_2)_3$Z$(CH_2)_2$Z$(CH_2)_2$X, —$(CH_2)_3$NHCH_3$, and the like.

One or more mandatory silanes can react with a terminally modified polymer, either alone or in conjunction with one or more types of optional silanes. The types of compounds that can be employed as optional silanes include those commonly referred to as dipodal silanes, available from any of a variety of commercial sources including, for example, Gelest Inc. (Morrisville, Pa.), Dalian Sibond Intl. Trade Co., Ltd. (Dalian, China), Silar Laboratories (Wilmington, N.C.), Advanced Polymer, Inc. (Carlstadt, N.J.), UCT Specialties, LLC (Bristol, Pa.), and the like.

A preferred class of optional silanes are those defined by general formula (II) above. Within this class, additional preference can be given to those where a is 0 or 1 (particularly 0) and/or those where $R^5$ is a group such as —$(CH_2)_2$—, —$(CH_2)_2E(CH_2)_2$—, —$(CH_2)_2E(CH_2)_3$—, —$(CH_2)_3E(CH_2)_2$—, or the like, with E representing a polysulfide moiety, particularly a di- or tetrasulfide moiety.

The relative amounts of the mandatory and optional silanes can vary widely, with equivalent ratios ranging from 1:2 to 2:1, 1:3 to 3:1, 1:5 to 5:1, 2:15 to 15:2 or even 1:10 to 10:1.

The relative amount of total silanes, regardless of type, to the amount of initiator employed in making the polymer, i.e., moles of $Li^+$, can range from ~1:10 up to a slight stoichiometric excess, e.g., ~3:2 or ~4:3.

The fluoride catalyzed reaction between the silane(s) and the terminally modified polymer can occur relatively quickly (less than ~6000 seconds, less than ~3000 seconds, and even less than ~1500 seconds) at moderate temperatures, e.g., ~0° to ~80° C. Elevated pressures are not required, although they can be employed if desired.

Without wishing to be bound by theory, fluoride ion is believed to cleave one of the Si—O bonds in the terminally modified polymer that result from reaction of a carbanionic polymer with a formula (IIIa) or (IIIb) compound, with this cleaving providing a site for reaction with an added silane. Depending on the specific type(s) and amount(s) of formula (III) compound employed in the polymer modification reaction and the amount(s) of the silane(s) employed in the subsequent functionalization reaction, the final functionalized polymer can retain a portion of the radical of the formula (III) compound or, in some circumstances, no remnant of that radical remains. In other words, the reaction product of the terminally modified polymer and the silane(s) might or might not have any remaining general formula (I)-type units. Where no such formula (I)-type units remain, the radical of one of the silanes can be directly bonded to a carbon atom of the polymer chain, although in many embodiments one or more general formula (I)-type units will be interposed between the last C atom of the polymer chain and the radical(s) of the silane(s) that attach at the terminus of the polymer chain.

Although typically not required, if desired, quenching can be conducted by stirring the functionalized polymer and an active hydrogen-containing compound, such as an alcohol or acid, for up to ~120 minutes at temperatures of from ~25° to ~150° C.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any conventionally employed tread stock rubber including natural rubber and/or nonfunctionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, NBR, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in J. Am. Chem. Soc., vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents are compounds which include a functional group capable of bonding physically and/or chemically with a group on the surface of the silica filler (e.g., surface silanol groups) and a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the types of functionalities mentioned above. An exemplary coupling agent is bis[3-(triethoxysilyl)-propyl]tetrasulfide. One or more coupling agents can be added to the elastomeric (rubber) composition if desired, although the functionalized polymer of the present invention can be utilized in elastomeric compositions that do not include such coupling agents.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, Encyclopedia of Chem. *Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly ~170° C. Vulcanizates prepared from reinforced rubber compounds of the type just described can be used for a variety of purposes including, inter alia, as an inner liners for inflated articles such as tires and sporting equipment (e.g., air filled balls).

Various embodiments of the present invention have been provided by way of example and not limitation. As evident from the foregoing descriptions, general preferences regarding features, ranges, numerical limitations and embodiments are to the extent feasible, as long as not interfering or incompatible, envisioned as being capable of being combined with other such generally preferred features, ranges, numerical limitations and embodiments.

The following non-limiting, illustrative examples provide specific conditions and materials that have proven useful in the practice of the present invention. Inventive examples employ hexamethylcyclotrisiloxane (formula (IIIa) compound where each Z is O and each $R^1$ and $R^2$ is methyl) in the reactions with living polymers, but this choice can be explained by cost and ease of availability, as well as a desire to permit direct comparisons between vulcanizates employing the various polymers. This consistent use of a single species of cyclic compound should not be considered limiting, as all formula (III) compounds are believed to be similarly useful.

Some of the examples include physical testing data for vulcanizates prepared from elastomeric compositions, i.e., rubber compounds that include functionalized polymers of the type described above. Data from certain of these are presented because those tests have come to be recognized as correlating certain physical properties of vulcanizates with performance of products, particularly tire treads, made therefrom. For example, reductions in (elastic) hysteresis have been found to correlate with higher rebound values and lower loss tangent values (tan δ) at high temperature, better handling performance often correlates with higher elastic modulus values at high temperature and strain, ice traction has been found to correlate with lower modulus values at low temperatures, etc. (In the foregoing, "high temperature" typically is considered to be ~50°-65° C. while "low temperature" is considered to be ~0° to −25° C.)

EXAMPLES

In the examples, dried glass vessels previously sealed with extracted septum liners and perforated crown caps under a positive $N_2$ purge were used for all preparations.

The following materials were obtained from a laboratory storeroom or synthesized: butadiene solution (in hexane), styrene solution (33.5% in hexane), hexane, n-butyllithium solution (1.6 M in hexane), KTA solution (1.0 M in hexane), 2,2-bis(2'-tetrahydrofuryl)propane (1.6 M solution in hexane, stored over CaH2), and butylated hydroxytoluene (BHT) solution in hexane.

Commercially available reagents and starting materials included the following, all of which were acquired from Sigma-Aldrich Co. (St. Louis, Mo.) and used without further purification unless otherwise noted in a specific example: hexamethylcyclotrisiloxane, (3-tri-methoxysilylpropyl)diethylenetriamine, 3-(1,3-dimethylbutylidene)aminopropyltriethoxysilane, 1,2-bis(trimethoxysilyl)ethane, bis[3-(triethoxysilyl)propyl]disulfide, bis[(3-triethoxysilyl)-propyl]tetrasulfide, and 1.0 M solution of TBAF in THF.

Examples 1-2: Control and Comparative Polymers

To a $N_2$-purged reactor equipped with a stirrer was added 1.97 kg hexane, 0.76 kg styrene solution, and 2.21 kg butadiene solution (21.7% by wt. in hexane). The reactor was charged with 3.90 mL n-butyllithium solution, followed by 0.5 mL KTA solution and 0.3 mL 2,2-bis(2'-tetrahydrofuryl)propane solution. The reactor jacket was heated to 50° C. and, after ~36 minutes, the batch temperature peaked at ~75° C.

After an additional ~32 minutes, portions of the polymer cement were dropped into dried glass bottles.

To one bottle was added isopropanol, and this control polymer is identified as sample CL-1 in Table 1 below.

To the other bottle was added 0.17 mL 3.0 M 3-(1,3-dimethylbutylidene)aminopropyltriethoxysilane, and this comparative polymer is identified as sample CP-2 in Table 1 below.

The bottles containing each of samples 1 and 2 were kept in a 50° C. water bath for ~30 minutes before the polymer cements were dropped separately into isopropanol containing BHT and then drum dried.

Examples 3-4: Comparative Polymers

The polymerization from Examples 1-2 was repeated. The peak temperature of ~75° C. was reached after ~31 minutes. Approximately 30 minutes after peak temperature was reached, ~6.2 mL hexamethylcyclotrisiloxane solution (1.0 M in hexane) was charged, and the polymer cement was stirred at ~50° C. for ~30 minutes before being dropped into dried glass bottles.

To one bottle was added isopropanol, and this control polymer is identified as sample CP-3 in Table 1 below.

To the other bottle was added sufficient 1.0 M TBAF solution to provide a TBAF-to-Li ratio of ~3:5, and this comparative polymer is identified as sample CP-4 in Table 1 below.

The bottles containing each of samples 3 and 4 were kept in a 50° C. water bath for ~30 minutes before the polymer cements were dropped separately into isopropanol containing BHT and then drum dried.

Example 5: Functionalized Polymer

The polymerization from Examples 1-2 was repeated. The peak temperature of ~75° C. was reached after ~30 minutes. Approximately 30 minutes after peak temperature was reached, ~6.2 mL hexamethylcyclotrisiloxane solution (1.0 M in hexane) was charged, and the polymer cement was stirred at ~50° C. for ~30 minutes before being dropped into a dried glass bottle.

To the bottle was added (1) 0.13 mL 1,2-bis(trimethoxysilyl)ethane (3.96 M), (2) 0.13 mL N-(2-aminoethyl)-3-aminopropyltriethoxysilane (3.75 M) and (3) sufficient 1.0 M TBAF solution to provide a TBAF-to-Li$^+$ ratio of ~3:5. The bottle was kept in a 50° C. water bath for ~30 minutes before the polymer cement was dropped into isopropanol containing BHT and then drum dried. This polymer is identified as sample 5 in Table 1 below.

Examples 6-7: Functionalized Polymers

The polymerization from Examples 1-2 was repeated with the following exceptions: the amount of hexane was changed to 1.89 kg and 2.29 kg of a 20.9% (by wt.) butadiene solution was used. The peak temperature of ~75° C. was reached after ~28 minutes. Approximately 30 minutes after peak temperature was reached, ~6.2 mL hexamethylcyclotrisiloxane solution (1.0 M in hexane) was charged, and the polymer cement was stirred at ~50° C. for ~30 minutes before being dropped into dried glass bottles.

To one bottle was added (1) 0.26 mL bis[3-(triethoxysilyl)propyl]disulfide (1.94 M), (2) 0.13 mL N-(2-aminoethyl)-3-aminopropyltriethoxysilane (3.75 M) and (3) sufficient 1.0 M TBAF solution to provide a TBAF-to-Li$^+$ ratio of ~3:5.

To the other bottle was added (1) 0.26 mL bis[3-(triethoxysilyl)propyl]disulfide (1.94 M), (2) 0.13 mL (3-trimethoxysilylpropyl)diethylenetriamine (3.88 M) and (3) sufficient 1.0 M TBAF solution to provide a TBAF-to-Li$^+$ ratio of ~3:5.

The bottles were kept in a 50° C. water bath for ~30 minutes before the polymer cements were dropped separately into isopropanol containing BHT and then drum dried. These polymers are identified as, respectively, samples 6 and 7 in Table 1 below.

Example 8: Functionalized Polymer

The polymerization from Examples 1-2 was repeated with the following exception: as an initiator was employed a functional initiator prepared by mixing a solution of 2.9 mL 4-dimethylaminostyrene (2.0 M in cyclohexane) in 10 mL hexane, 3.9 mL n-butyllithium solution, and 0.3 mL 2,2-bis(2'-tetrahydrofuryl)propane solution. (No separate additional 2,2-bis(2'-tetrahydrofuryl)propane solution was added to the reaction vessel.) The functional initiator solution was added to the polymerization vessel prior to the KTA solution.

The peak temperature of ~75° C. was reached after ~34 minutes and, ~30 minutes after peak temperature was reached, ~6.2 mL hexamethylcyclotrisiloxane solution (1.0 M in hexane) was charged, and the polymer cement was stirred at ~50° C. for ~30 minutes before being dropped into a dried glass bottle.

To the bottle was added (1) 0.25 mL bis[3-(triethoxysilyl)propyl]tetrasulfide (2.03 M), (2) 0.13 mL N-(2-aminoethyl)-3-aminopropyltriethoxysilane (3.75 M) and (3) sufficient 1.0 M TBAF solution to provide a TBAF-to-Li$^+$ ratio of ~3:5. The bottle was kept in a 50° C. water bath for ~30 minutes before the polymer cement was dropped into isopropanol containing BHT and then drum dried. This polymer is identified as sample 8 in Table 1 below.

Examples 9-16: Properties of Polymers from Examples 1-8

Spectroscopic analysis of polymer sample CL-1 indicated that it had a styrene content of 36-37 mole percent and that ~28% of its butadiene mer were incorporated in a vinyl configuration.

The properties of polymer samples from Examples 1-8 are summarized below in Table 1 where $M_p$ represents peak molecular weight.

TABLE 1

| | Properties of polymers from Examples 1-8 | | | | | | | |
|---|---|---|---|---|---|---|---|---|
| | 9 | 10 | 11 | 12 | 13 | 14 | 15 | 16 |
| polymer sample | CL-1 | CP-2 | CP-3 | CP-4 | 5 | 6 | 7 | 8 |
| $M_n$ (kg/mol) | 95.0 | 98.0 | 86.7 | 96.6 | 89.7 | 97.7 | 112.0 | 71.9 |

TABLE 1-continued

Properties of polymers from Examples 1-8

|  | 9 | 10 | 11 | 12 | 13 | 14 | 15 | 16 |
|---|---|---|---|---|---|---|---|---|
| $M_w/M_n$ | 1.05 | 1.17 | 1.06 | 1.16 | 1.24 | 1.23 | 1.08 | 1.50 |
| $M_p$ (kg/mol) | 99.6 | 98.9 | 91.6 | 91.7 | 99.7 | 122.4 | 122.4 | 101.3 |
| $T_g$ (° C.) | −45.4 | −43.4 | −47.2 | −46.3 | −43.7 | −39.6 | −39.7 | −47.8 |
| % coupling | 1.8 | 14.9 | 1.5 | 21.0 | 18.5 | 5.7 | 1.4 | 37.8 |

Example 17: High Vinyl Functionalized Polymer

The polymerization from Example 8 was repeated with the following exceptions: the functional initiator was prepared with 1.2 mL 2,2-bis(2'-tetrahydrofuryl)propane solution, and no KTA solution was added to the polymerization vessel. The peak temperature of ~64° C. was reached after ~38 minutes and, ~30 minutes after peak temperature was reached, ~6.2 mL hexamethylcyclotrisiloxane solution (1.0 M in hexane) was charged, and the polymer cement was stirred at ~50° C. for ~30 minutes before being dropped into a dried glass bottle. This cement was subjected to the same functionalization and post-functionalization processing described in Example 8.

Spectroscopic analysis of recovered polymer indicated that it had a styrene content of ~20 mole percent and that ~55% of its butadiene mer were incorporated in a vinyl configuration. Other properties of this polymer were as follows:

| $M_n$ (kg/mol) | 114.8 |
|---|---|
| $M_w/M_n$ | 1.27 |
| $M_p$ (kg/mol) | 157.2 |
| $T_g$ (° C.) | −36.9 |
| % coupling | 28.1 |

Examples 18-26: Filled Compositions and Vulcanizates

The polymers from Examples 1-8 and 17 were used to make filled compositions (compounds), employing the formulation shown in Table 2a (carbon black as sole particulate filler) and Table 2b (silica as sole particulate filler) where N-phenyl-N'-(1,3-dimethylbutyl)-p-phenylenediamine (6PPD) acts as an antioxidant and 2,2'-dithiobis(benzothiazole) (MBTS), N-tert-butylbenzothiazole-2-sulfenamide (TBBS) and N,N'-diphenylguanidine (DPG) act as accelerators. The extender oil contained a relatively low amount of polycyclic aromatic compounds.

TABLE 2a

Carbon black compound formulation

|  | Amount (phr) |
|---|---|
| Masterbatch |  |
| synthesized polymer | 100 |
| carbon black (N343 type) | 50 |
| wax | 2 |
| 6PPD | 0.95 |
| stearic acid | 2 |
| extender oil | 10 |
| Final |  |
| sulfur | 1.5 |
| ZnO | 2.5 |
| TBBS | 0.5 |
| MBTS | 0.5 |
| DPG | 0.3 |
| TOTAL | 170.25 |

TABLE 2b

Silica compound formulation

|  | Amount (phr) |
|---|---|
| Masterbatch |  |
| synthetic polymer | 80 |
| natural rubber | 20 |
| silica | 52.5 |
| wax | 2 |
| 6PPD | 0.95 |
| stearic acid | 2 |
| extender oil | 10 |
| Re-mill |  |
| 60% disulfide silane on carrier | 5 |
| silica | 2.5 |
| Final |  |
| sulfur | 1.5 |
| ZnO | 2.5 |
| MBTS | 2.0 |
| TBBS | 0.7 |
| DPG | 1.4 |
| TOTAL | 183.05 |

Compounds were cured for ~15 minutes at 171° C. Results of physical testing on these compounds, as well as vulcanizates made from these compounds, are shown below in Tables 3a (carbon black) and 3b (silica).

Hysteresis (tan δ) data were obtained from dynamic experiments conducted at 2% strain and 10 Hz (temperature sweep). With respect to tensile properties, M/E is the ratio of modulus at break (in MPa) to percent elongation at break. Compound Mooney viscosity ($ML_{1+4}$) values were determined with an Alpha Technologies™ Mooney viscometer (large rotor) using a one-minute warm-up time and a four-minute running time.

TABLE 3a

| Compound and vulcanizate properties (carbon black) | | | | | | | | |
|---|---|---|---|---|---|---|---|---|
| | 18 | 19 | 20 | 21 | 22 | 23 | 24 | 25 | 26 |
| polymer sample | CL-1 | CP-2 | CP-3 | CP-4 | 5 | 6 | 7 | 8 | 17 |
| tan δ | 0.2670 | 0.1569 | 0.2740 | 0.2674 | 0.1430 | 0.1763 | 0.2116 | 0.1452 | 0.1211 |
| Δ tan δ | 0.1342 | 0.0461 | 0.1330 | 0.1261 | 0.0258 | 0.0576 | 0.0897 | 0.0305 | 0.0362 |
| bound rubber (%) | 9.9 | 44.2 | 11.3 | 10.9 | 39.1 | 27.3 | 20.0 | 41.2 | 45.5 |
| $ML_{1+4}$ @ 100° C. | 21.1 | 61.5 | 22.8 | 26.7 | 39.1 | 40.1 | 36.2 | 41.1 | 63.8 |

TABLE 3b

| Compound and vulcanizate properties (silica) | | | | | | | | |
|---|---|---|---|---|---|---|---|---|
| | 18 | 19 | 20 | 21 | 22 | 23 | 24 | 25 | 26 |
| polymer sample | CL-1 | CP-2 | CP-3 | CP-4 | 5 | 6 | 7 | 8 | 17 |
| tan δ | 0.1701 | 0.1026 | 0.1007 | 0.1740 | 0.0920 | 0.0900 | 0.0882 | 0.0906 | 0.0681 |
| Δ tan δ | 0.0813 | 0.0257 | 0.0117 | 0.0778 | 0.0138 | 0.0129 | 0.0102 | 0.0147 | 0.0160 |
| bound rubber (%) | 14.4 | 67.0 | 72.6 | 26.3 | 76.2 | 70.5 | 73.1 | 76.7 | 82.6 |
| M/E | 0 | — | — | — | 54.6 | 72.4 | — | — | 77.6 |
| $ML_{1+4}$ @ 100° C. | 18.1 | 46.1 | 36.1 | 18.2 | 50.8 | 47.0 | 48.3 | 47.9 | 61.8 |

That which is claimed is:

1. A method for providing terminal functionality to a reactive polymer that comprises ethylenic unsaturation, said method comprising:
   a) providing a solution of said reactive polymer in a hydrocarbon solvent;
   b) introducing to said solution a cyclic compound defined by the formula

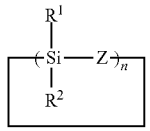

where
   each of $R^1$ and $R^2$ independently is a hydrogen atom or a substituted or unsubstituted hydrocarbyl group,
   n is an integer of from 3 to 8, inclusive, and
   Z is an O atom, S atom, or $NR^3$ group where $R^3$ is a hydrogen atom or a hydrocarbyl group,
   thereby providing a reactant polymer; and
   c) introducing to said solution or introducing said solution to a source of fluoride ions and one or more alkoxysilanes, wherein at least one of said one or more alkoxysilanes comprises at least one primary amine, secondary amine, phosphine, hydroxyl, thiol, cyano, urea or thiourea group and allowing said one or more alkoxysilanes to react with said reactant polymer, thereby providing said terminal functionality to said polymer.

2. The method of claim 1 wherein said cyclic compound is a cyclosiloxane that comprises from 3 to 8 Si atoms.

3. The method of claim 2 wherein the molar ratio of said one or more alkoxysilanes to said reactant polymer is from 1:10 to 3:2.

4. The method of claim 1 wherein said source of fluoride ions is a tetraalkylammonium fluoride.

5. The method of claim 1 wherein said one or more alkoxy-silanes further comprises at least one alkoxysilane defined by the formula $(R^4O)_{3-a}R^4{}_aSiR^5SiR^4{}_a(OR^4)_{3-a}$ where each a independently is an integer of from 0 to 2, each $R^4$ independently is a $C_1$-$C_{12}$ alkyl group, and $R^5$ is a $C_2$-$C_{10}$ alkylene group that optionally comprises a polysulfide linkage.

6. The method of claim 5 wherein said reactive polymer is a carbanionic polymer that comprises ethylenic unsaturation.

7. The method of claim 6 wherein the molar ratio of said one or more alkoxysilanes to said reactant polymer is from 1:10 to 3:2.

8. The method of claim 5 wherein the molar ratio of said at least one alkoxysilane defined by the formula $(R^4O)_{3-a}R^4{}_aSiR^5SiR^4{}_a(OR^4)_{3-a}$ to said at least one alkoxysilane that comprises at least one primary amine, secondary amine, phosphine, hydroxyl, thiol, cyano, urea or thiourea group is from 1:3 to 3:1.

9. The method of claim 5 wherein $R^5$ is a $C_2$-$C_{10}$ alkylene group that comprises a polysulfide linkage.

10. The method of claim 5 wherein said source of fluoride ions is a tetraalkylammonium fluoride.

11. The method of claim 2 wherein said one or more alkoxysilanes are added in stoichiometric excess relative to said reactant polymer.

12. The method of claim 11 wherein said source of fluoride ions is a compound having the general formula $R^6{}_4N^+F^-$ where each $R^6$ independently is H or a substituted or unsubstituted hydrocarbyl group.

13. The method of claim 12 wherein said hydrocarbyl group is an aryl, (cyclo)alkyl, alkenyl, alkenaryl, aralkenyl, alkaryl, or aralkyl group.

14. The method of claim 11 wherein said one or more alkoxy-silanes further comprises at least one alkoxysilane defined by the formula $(R^4O)_{3-a}R^4{}_aSiR^5SiR^4{}_a(OR^4)_{3-a}$ where each a independently is an integer of from 0 to 2, each $R^4$ independently is a $C_1$-$C_{12}$ alkyl group, and $R^5$ is a $C_2$-$C_{10}$ alkylene group that optionally comprises a polysulfide linkage.

15. The method of claim 14 wherein the molar ratio of said at least one same alkoxysilane defined by the formula $(R^4O)_{3-a}R^4{}_aSiR^5SiR^4{}_a(OR^4)_{3-a}$ to said at least one alkoxysilane that comprises at least one primary amine, secondary amine, phosphine, hydroxyl, thiol, cyano, urea or thiourea group is from 1:3 to 3:1.

16. The method of claim 14 wherein $R^5$ is a $C_2$-$C_{10}$ alkylene group that comprises a polysulfide linkage.

17. A method for providing terminal functionality to a reactive polymer that comprises ethylenic unsaturation, said method comprising:
   a) providing a solution of a hydrocarbon solvent and a carbanionic polymer that comprises ethylenic unsaturation;
   b) introducing to said solution a cyclic compound defined by the formula

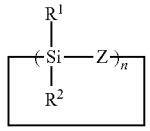

where
      each of $R^1$ and $R^2$ independently is a hydrogen atom or a substituted or unsubstituted hydrocarbyl group,
      n is an integer of from 3 to 8, inclusive, and
      Z is an O atom, S atom, or $NR^3$ group where $R^3$ is a hydrogen atom or a hydrocarbyl group,
      thereby providing a reactant polymer; and
   c) introducing to said solution or introducing said solution to a source of fluoride ions and a stoichiometric excess of alkoxysilanes that comprise
      (1) at least one alkoxysilanes that comprises at least one primary amine, secondary amine, phosphine, hydroxyl, thiol, cyano, urea or thiourea group and
      (2) at least one alkoxysilane defined by the formula $(R^4O)_{3-a}R^4_a SiR^5 SiR^4_a(OR^4)_{3-a}$ where each a independently is an integer of from 0 to 2, each $R^4$ independently is a $C_1$-$C_{12}$ alkyl group, and $R^5$ is a $C_2$-$C_{10}$ alkylene group that optionally comprises a polysulfide linkage, and
      allowing said alkoxysilanes to react with said reactant polymer, thereby providing said terminal functionality to said polymer.

18. The method of claim 17 wherein said source of fluoride ions is a compound having the general formula $R^6_4N^+F^-$ where each $R^6$ independently is H or a substituted or unsubstituted hydrocarbyl group.

19. The method of claim 18 wherein said hydrocarbyl group is an aryl, (cyclo)alkyl, alkenyl, alkenaryl, aralkenyl, alkaryl, or aralkyl group.

20. The method of claim 18 where each $R^6$ is an alkyl group.

* * * * *